United States Patent [19]

Fromme et al.

[11] 4,455,703
[45] Jun. 26, 1984

[54] DOCKBOARD ASSEMBLY

[75] Inventors: Klaus Fromme, Milwaukee; James Hagen, Hartland, both of Wis.

[73] Assignee: Delta Development Group Internat'l., Inc., Milwaukee, Wis.

[21] Appl. No.: 355,688

[22] Filed: Mar. 8, 1982

[51] Int. Cl.³ .............................................. E01D 1/00
[52] U.S. Cl. ............................................... 14/71.3
[58] Field of Search ................. 14/71.3, 72.5, 71.1, 14/71.5, 71.7

[56] References Cited

U.S. PATENT DOCUMENTS

| | | | |
|---|---|---|---|
| 2,560,064 | 7/1951 | Astry | 14/71.7 X |
| 2,993,219 | 7/1961 | Pennington | 14/71.7 |
| 3,006,008 | 10/1961 | Loomis et al. | 14/71.3 |
| 3,034,162 | 5/1962 | Smith | 14/72.5 |
| 3,138,812 | 6/1964 | Prosser | 14/71.3 |
| 3,167,796 | 2/1965 | Layne | 14/71.3 |
| 3,268,932 | 8/1966 | Hartman | 14/71.3 |
| 3,299,456 | 1/1967 | Dieter et al. | 14/71.3 |
| 3,763,514 | 10/1973 | Bishop | 14/71.3 |
| 3,882,563 | 5/1975 | Smith et al. | 14/71.3 |
| 4,224,709 | 9/1980 | Alten | 14/71.3 |

Primary Examiner—Ernest R. Purser
Assistant Examiner—Beverly E. Hjorth
Attorney, Agent, or Firm—Ronald E. Barry

[57] ABSTRACT

An adjustable dockboard for bridging the gap between a loading dock and a carrier, the dockboard including a ramp member hingedly connected to the loading dock and biased to an elevated position, and a tread plate assembly positioned in the ramp member and movable to an extended position to engage the bed of a carrier when the ramp member is lowered, the tread plate assembly being locked into a set position on engagement with the bed of the carrier, the tread plate assembly being removeable from the carrier for repair and maintenance and the ramp member being seated in the dockboard by its own weight.

10 Claims, 7 Drawing Figures

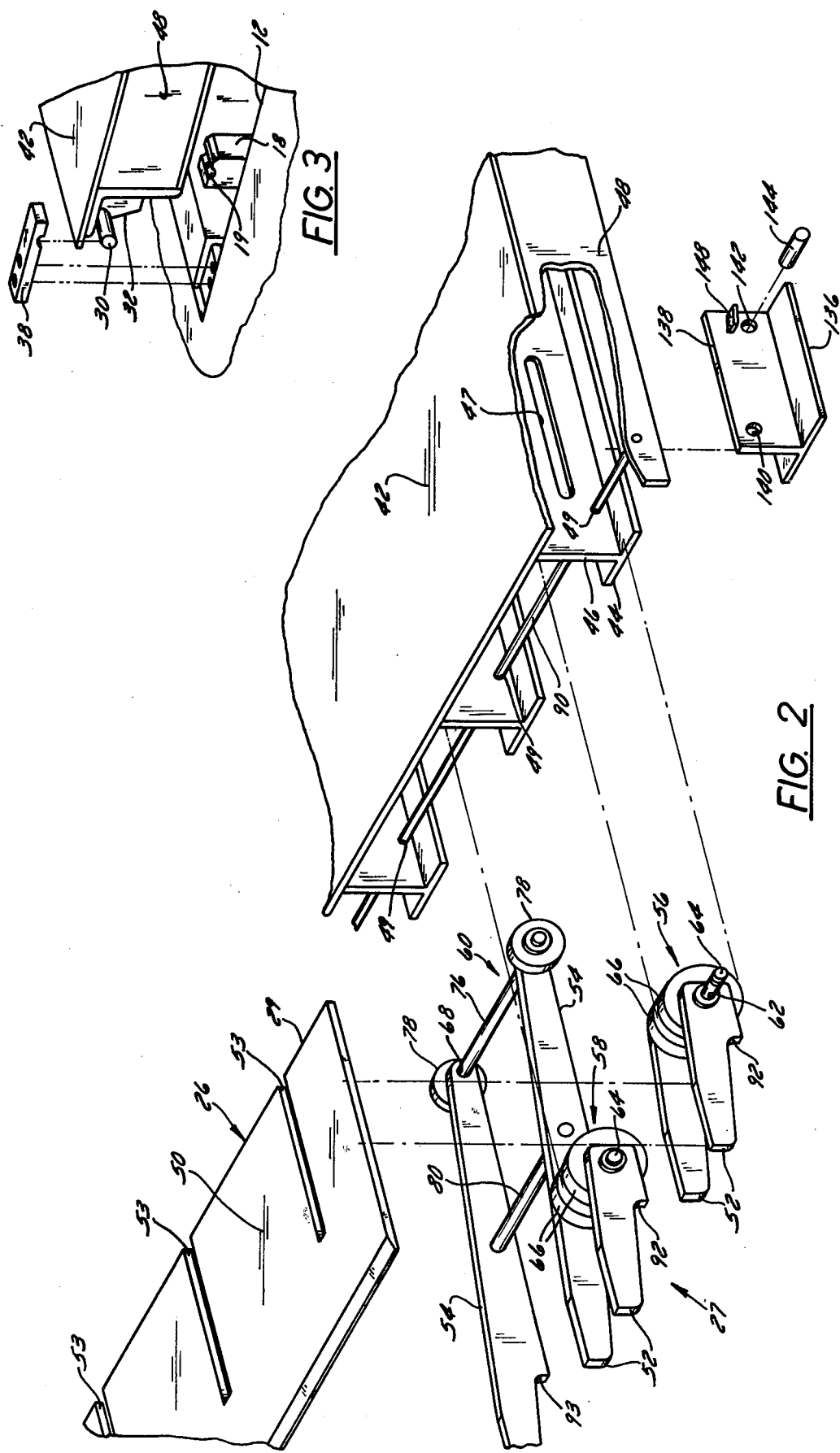

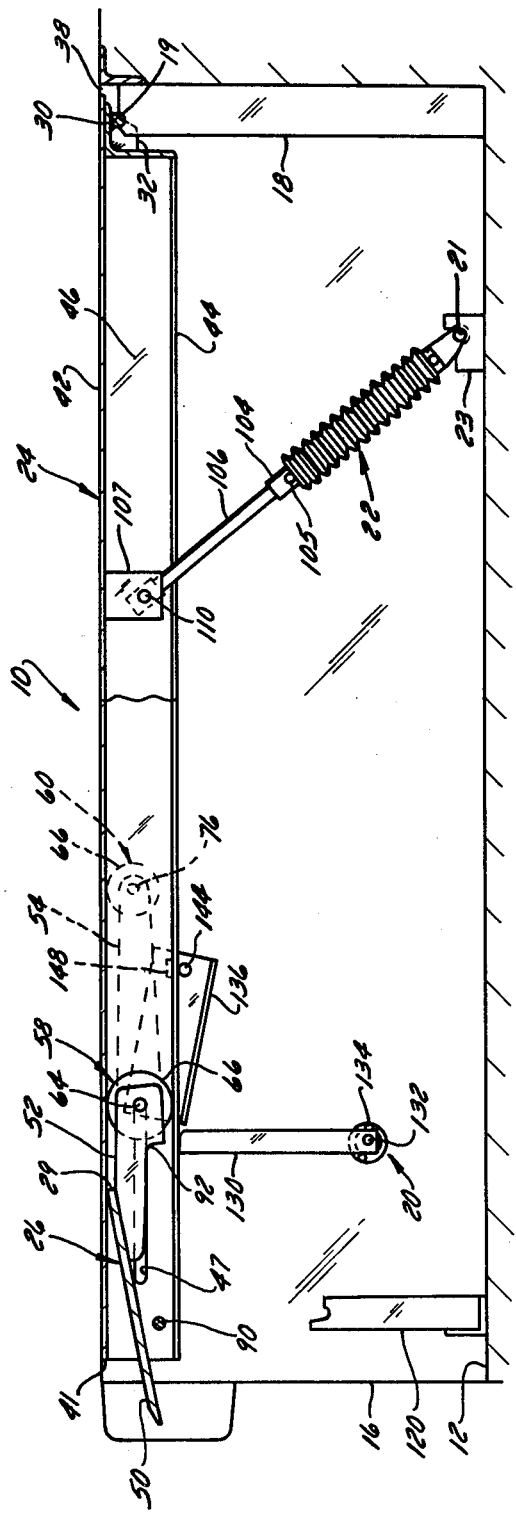

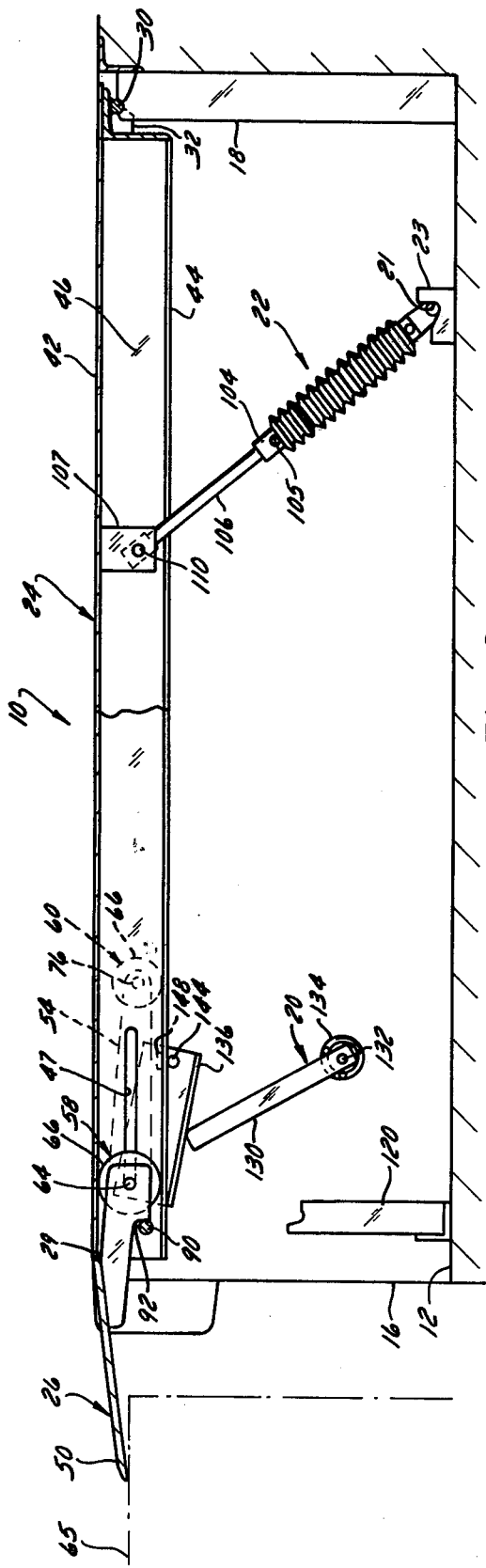
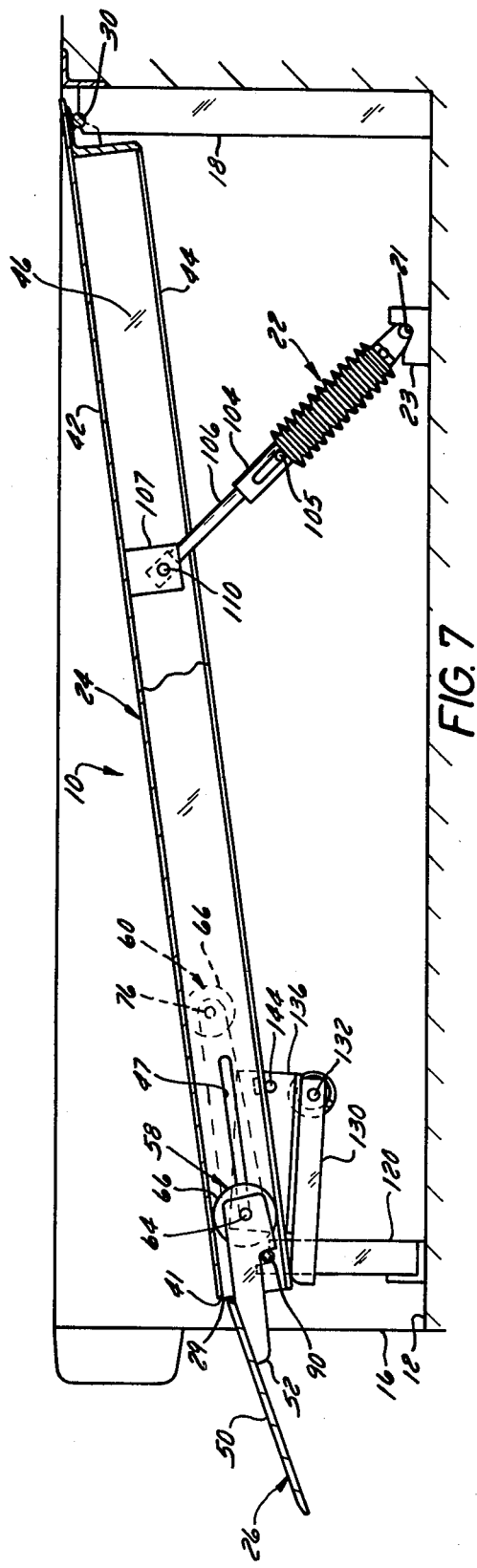

DOCKBOARD ASSEMBLY

BACKGROUND OF THE INVENTION

Dockboards of the type contemplated herein generally include a ramp which is hingedly supported at its rear edge to a pivotable support provided on a loading dock. An extension lip is generally provided at the front edge of the ramp to bridge the gap between the ramp and the bed of a truck to be loaded or unloaded. The lip is pivotally connected to the ramp for movement between a horizontal operative position and a vertical storage position. The ramp is stored within a recess or pit provided in the loading dock and is supported in a cross-traffic position so that it is flush with the surface of the dock. In operation, the ramp is elevated and the lip pivoted from a depending storage position to an extending operative position. The truck is backed into position against the dock and the ramp lowered until the lip comes to rest on the bed of the truck. When the lip is resting on the bed of the truck, all of the forces acting on the ramp when the lip is in the load position are exerted upon the hinge between the lip and the ramp. These forces if excessive can cause damage requiring maintenance and repair of the lip. In this type of a dockboard maintenance and repair are time-consuming and difficult due to the permanent mounting arrangement of the dockboard to the loading dock.

SUMMARY OF THE INVENTION

The dockboard assembly, according to the present invention, includes a ramp and an extension lip or tread plate which is telescoped into the ramp when not in use. When the dockboard assembly is raised to the elevated position in order to engage the bed of a truck, the tread plate assembly is moved outward from the ramp and is provided with a carriage which absorbs the forces acting on the tread plate by the bed of the truck.

Maintenance and repair of the dockboard assembly has been simplified by mounting the dockboard so that it can be lifted directly off of the dock. This has been achieved by using the weight of the dockboard assembly as the primary force holding the dockboard in position on the dock. With this arrangement no adjustment or lubrication points are necessary under the dockboard. No side clearance is required to remove or service the lip since no lip rod is used.

IN THE DRAWINGS

FIG. 2 is an exploded perspective view of a portion of the tread plate and carrier assembly, with a portion of the ramp broken away to show the interior of the ramp.

FIG. 3 is an exploded perspective view showing a portion of the mounting arrangement for the ramp on the dock.

FIG. 4 is an elevation view in section showing the dockboard assembly in the cross-traffic position in the loading dock with the thread plate assembly telescoped into the ramp.

FIG. 5 is a view similar to FIG. 4 showing the dockboard assembly elevated and the tread plate assembly extended to engage the bed of a truck.

FIG. 6 is a view similar to FIG. 4 showing the dockboard assembly lowered to engage the tread plate with the bed of a truck or carrier.

FIG. 7 is a view similar to FIG. 4 showing the dockboard assembly lowered to release the tread plate assembly for return motion into the dock.

DESCRIPTION OF THE INVENTION

Figure 1:
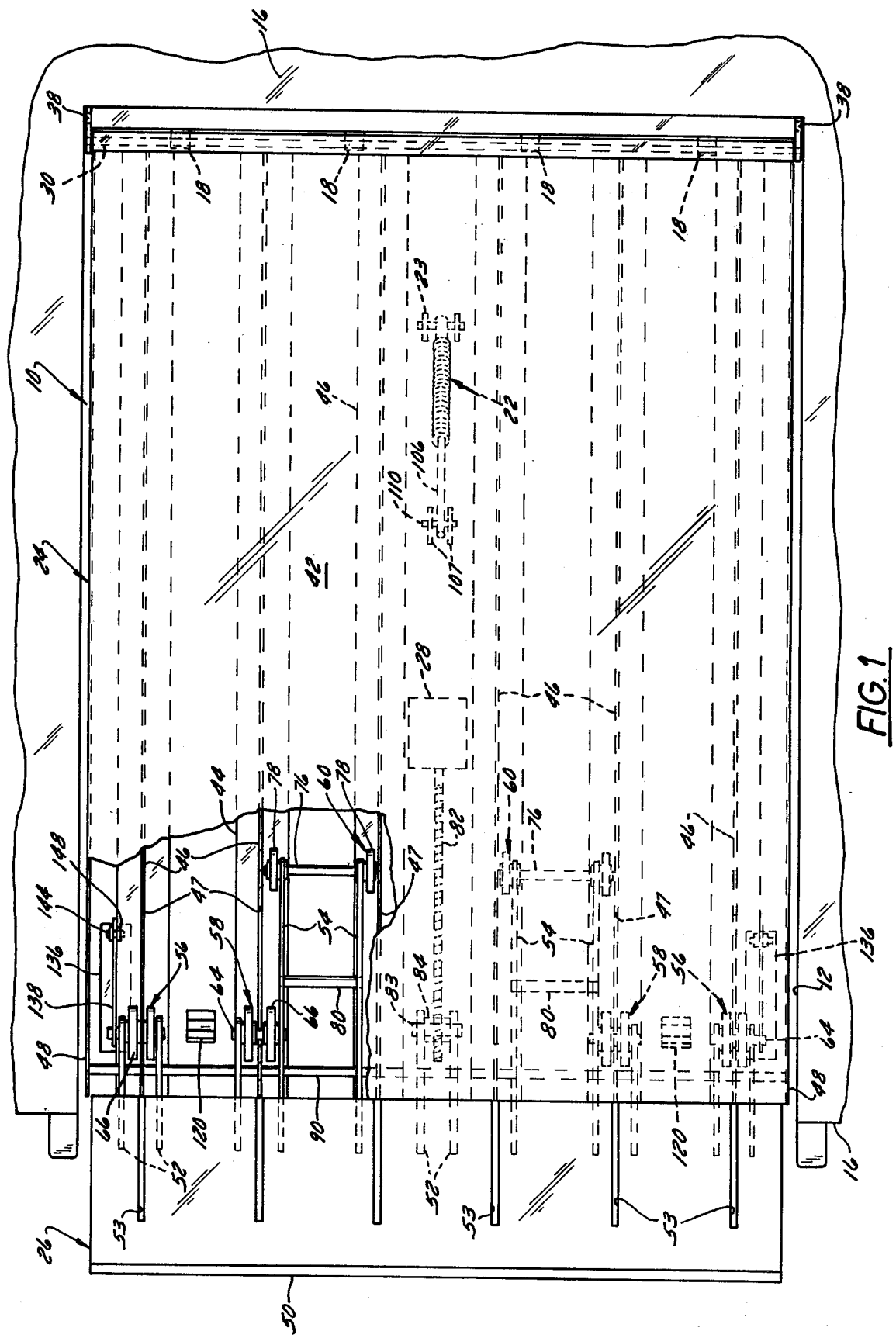
FIG. 1 is a top view of the dockboard assembly according to the invention, shown mounted in a loading dock, with a portion of the ramp broken away to show a position of the lip or tread plate with carriage assembly extended.

As seen in the drawings, the dockboard assembly 10 according to the invention is positioned within a recess or pit 12 provided in a loading dock 16. The dockboard assembly is pivotally supported at the rear by means of a number of support members 18 and is held in the cross-travel position by means of travel stop assemblies 20 mounted on the sidewalls of the pit 12. The dockboard assembly is balanced by means of a spring assembly 22 made up of a series of individual disc springs which is seated in a groove 21 in a block 23 located on the bottom of pit 12. Failure of a disc will not hamper dockboard operation.

As seen in FIG. 1, the dockboard assembly 10 includes a ramp 24 and a tread plate assembly 26. The tread plate assembly 26 is mounted for telescoping movement into and out of the ramp 24 by means of a motor 28. The tread plate assembly 26 is shown in an operative position for engagement with the bed of a truck or carrier.

The dockboard assembly 10 is mounted for pivotal movement on the support members 18 in the pit 12 by means of a rod 30 which is supported across the rear edge of the ramp 24 by means of plates 32. The rod 30 is seated in a groove 19 provided in the members 18 and is retained therein by means of a pair of plates 38. The plates 38 are used to lock the rod 30 in the grooves 19 in the members 18. The plates are retained in the dock by means of bolts (not shown). The plates 38 are the only means for holding the dockboard assembly on the dock. If the plates 38 are removed, the dockboard assembly can be lifted out of the pit 12 as described hereinafter.

The ramp 24 includes an upper plate 42 and a number of T-beams 46 having bottom plates 44. The sides of the ramps are closed by side plates 48. Each of the T-beams 46 is provided with a slot 47 and an opening 49. (FIG. 2)

The tread plate assembly 26 includes a tread plate 50 which is secured to a carrier assembly 27 formed by a number of short lugs 52 and long lugs 54 and a number of roller assemblies 56, 58 and 60. The tread plate 50 includes a number of slots 53 to provide clearance for the T-beams 46. The lugs 52 and 54 are welded to the bottom of the tread plate 50. Each of the short lugs 52 includes an opening 62 and a stop 92. Each of the long lugs 54 includes an opening 68 and a stop 93. One of the long lugs 54 in each pair includes an opening 62.

The outer roller assemblies 56 are supported on a pair of the short lugs 52. Each of the roller assemblies 56 includes a pin 64 which extends through the openings 62 in the lugs 52 and the slot 47 in the T-beams 46. A pair of nylon rollers 66 are mounted on the pins 64 on opposite sides of the T-beams 46.

The roller assemblies 58 are mounted on one of the lugs 52 and one of the long lugs 54. Each support roller assembly 58 includes a pin 64 which passes through the openings 62 and the slot 47 in the T-beams 46. A pair of rollers 66 are provided on the pin 64 and are located on opposite sides of the T-beams 46.

The roller assemblies 60 are supported at the inner end of the long lugs 54. Each of the assemblies 60 includes a pivot pin 76 extending through the openings 68 with a nylon roller 78 mounted on each end of the pin 76. The rollers 78 on the assembly 60 are arranged to travel in the space between two of the T-beams 46 on the ramp. The lugs 54 are held in a spaced relation by means of a support pin 80 secured to the corresponding sides of the lugs 54.

As seen in FIG. 1, the tread plate assembly 26 can be moved in and out of the ramp by means of the motor 28. The motor 28 is a reversible electric motor that can be operated from a remote station on the loading dock. The motor is mounted in the ramp and includes a threaded shaft 82 which engages a nut 84 pivotally mounted on a pin 83 positioned in opening 62 in a pair of lugs 52 located at the center of the thread plate 50. The motor 28 is rotated in the forward or reverse direction to either move the tread plate assembly 26 to the storage position within the ramp or to the operative position with the tread plate 50 extending outwardly from the ramp.

Means are provided within the ramp to limit the outward movement of the tread plate assembly 26. Such means is in the form of a stop bar 90 which is pushed through the holes 49 provided in the T-beams 46 after the tread plate assembly 26 has been mounted in the ramp. The bar 90 is positioned to engage the stops 92 and 93 provided on each of the lugs 52 and 54, respectively.

It should be noted that the tread plate assembly 26 rides principally on the roller assemblies 56 and 58 and is free to pivot about the axis of the roller assembly axles or pins 64. The pivotal movement of the tread plate assembly 26 is limited by the amount of movement available for the roller assemblies 60. In this regard and referring to FIG. 4, the roller assemblies 60 are shown in engagement with the undersurface of the top plate 42. When the tread plate assembly 26 is moved to the operative position, as seen in FIG. 6, and the tread plate 50 engages the bed 65 of a truck or carrier, the carrier assembly will pivot about the axis of axles 64 until the roller assembly 60 comes into engagement with the top of the plate 44 of the T-beams 46. The rear edge 29 of the tread plate 50 will abut the front edge 41 of the upper ramp plate 42. Any force acting on the outer end of the tread plate 50 will be counterbalanced by the lever arm formed by the lugs 54 and roller assemblies 60.

One of the primary advantages of the dockboard assembly described herein is the ability to quickly and easily assemble or remove the tread plate assembly 26 from the ramp for maintenance or repair. On assembly, the stop pin 90 is removed from the ramp and the roller assemblies 60 on the tread plate assembly 26 and are inserted into the ramp far enough for the openings 62 in the lugs 52 to be aligned with the slots 47. The roller assemblies are then assembled by placing one of the rollers 66 on each side of the corresponding T-beam 46 and inserting the axle 64 through the rollers 66, the openings 62 and the corresponding slot 47. The same procedure is used for assembling the roller assemblies 56 to the outer set of lugs 52. The carrier assembly is then moved into the ramp far enough to provide clearance for the stop pin 90 which is then inserted through the openings 49 to lock the tread plate assembly 26 in the ramp.

The ramp is biased to the elevated position by means of the spring assembly 22. This assembly includes a number of Delville springs mounted on a hollow tube 104. An elevating rod 106 is mounted for axial movement within the hollow tube 104 and has its upper end pivotally connected to a mounting bracket 107 on the ramp by means of a pivot pin 110. Means in the form of a latch assembly 105 is provided in the spring assembly to neutralize the bias of the spring.

The spring assembly 22 normally has sufficient force to raise the ramp to the elevated position when the tread plate assembly 26 is fully retracted. When the ramp reaches the elevated position, the motor 28 is energized to move the tread plate assembly 26 outward to the operative position (FIG. 5) where the weight of the tread plate assembly will be sufficient to substantially counterbalance the force of the spring. The ramp will then lower itself to the truckbed due to the shift of the moment arm center of gravity. The latching mechanism 105 is not required to hold the ramp in solid contact with the truck as long as the lip is extended. The ramp will then be free to move with the truckbed.

Once the truck has been loaded and removed from the dock, the plate assembly 26 is retracted into the ramp. This is accomplished by lowering the ramp until it comes into engagement with lower-limit stops 120. In this regard, and referring to FIG. 7, it will be noted that the lower-limit stops 120 are positioned to engage the ends of rod 90. The motor 28 is reversed to draw the tread plate assembly into the ramp. The movement of the tread plate assembly into the ramp will change the weight sufficiently to allow the spring assembly 22 to raise the ramp above the level of cross travel. The ramp is then lowered until it engages the travel stop assembly 20 and the latch mechanism 105 set.

In this regard, the travel stop assembly 20 is provided on each side of the ramp. The assembly 20 includes a rod 130 mounted for pivotal movement on a pin 132 provided in the side wall of the pit 12. A spring 134 is used to bias the rod 130 to a vertical position to engage the bottom plate 44 on the T-beam 46 (FIG. 4). Whenever the ramp 24 is moved above the level of the dock, the travel stop rod 130 will automatically rotate to a generally vertical position. The ramp is then lowered until it engages rod 130 and the spring latch 105 is set to neutralize the spring 22.

The rod 130 is moved out of the path of travel of the ramp by means of a cam plate 136 mounted on the tread plate assembly 26. The cam plate 136 (FIG. 2) includes a pivot plate 138 having a hole 140 at one end and a hole 142 at the opposite end. The plate 138 is positioned in the space between the T-beam 46 on the ramp and is pivotally mounted on the end of the axle 64 of the wheel assembly 56, the axle 64 extending into the hole 140 in the plate 138. The cam plate 136 is held in an angular relation to the bottom plate 44 by means of a pin 144 provided in the hole 142 underneath of the bottom plate 44. The downward movement of the plate is limited by means of a stop member 148 provided on the pivot plate 138 in a position to engage the upper surface of the bottom plate 44. On movement of the carrier assembly 26 to the operative position, the cam plate 136 will move over the top of the upper end of the rod 130. On downward movement of the ramp, the cam plate 136 will engage the upper end of the rod 130, camming the rod 130 outwardly so that the ramp is free to move downward in the pit (FIG. 7).

The embodiments of the invention in which an exclusive property pr privilege is claimed, are defined as follows:

1. An adjustable dockboard comprising a ramp member,
   means for hingedly mounting said ramp member for pivotal movement on a loading dock, means mounted on the loading dock for biasing said ramp member to an elevated position,
   a tread plate assembly mounted for telescopic movement within said ramp member between a first position within said ramp member to a second position having a portion of said tread plate assembly forming a continuous extension of the upper surface of said ramp member on engagement with the bed of a carrier,
   travel stop means between said ramp member and said loading dock for locating said ramp member at a position flush with the top of the dock, means mounted on said tread plate assembly in a position to move said travel stop means to a position allowing for the ramp member to move below the top of the loading dock when the tread plate assembly is in the second position, and
   means connected to said ramp member for selectively moving said tread plate assembly between the first and second positions.

2. The dockboard according to claim 1, wherein said hingedly mounting means comprises a rod secured to the ramp member,
   said rod being adapted to be seated in a grooved member in the dock.

3. An adjustable dockboard for a loading dock having a grooved mounting structure,
   a ramp member having front and rear edges,
   means on the rear edge of said ramp member for engaging the grooved mounting structure so that the ramp member may swing about a horizontal axis,
   means operatively positioned between the ramp member and the loading dock to bias the ramp member to an elevated position, and
   a tread plate assembly mounted in said ramp member for movement between a storage position within said ramp member to an operative position forming an extension of said ramp member, said tread plate assembly includes
   a tread plate, a first roller assembly connected to said tread plate for supporting said tread plate for movement into and out of said ramp member, said first roller assembly including
   a number of rollers mounted on a common axis, said tread plate assembly being pivotable about said axis of said first rollers to allow the rear edge of said tread plate to engage the front edge of said ramp member whereby said tread plate forms a continuation of the upper surface of said ramp member, and
   a second roller assembly connected to said tread plate to limit the pivotal movement of said tread plate assembly whereby the force acting on the rear edge of said tread plate is transferred to the second roller assembly.

4. The dockboard according to claim 3 wherein said engaging means comprises a rod mounted on said ramp member which is adapted to be seated in the grooved mounting structure.

5. The dockboard according to claim 3 wherein said second roller assembly is located on the side of said first roller assembly opposite said tread plate.

6. The dockboard according to claim 5 including travel stop means mounted on the loading dock on each side of said ramp member for limiting the downward movement of said ramp member to the level of the top of the loading dock.

7. The dockboard according to claim 6 including means mounted on said tread plate assembly for camming said travel stop means to a position to allow the dockboard to move below the top of the loading dock when the tread plate assembly is in the operative position.

8. An adjustable dockboard for bridging the gap between a loading dock and the bed of a carrier,
   the dockboard including a ramp member having an upper plate and a number of beams mounted in a parallel spaced relation under said upper plate,
   a tread plate assembly mounted for movement on said beams from a first position beneath said upper plate to a second position forming an extension of said upper plate,
   said tread plate assembly including a tread plate and a carrier supporting said tread plate on said beams for movement from the first position to the second position wherein said tread plate forms an extension from the end of said upper plate, said carrier including
   a first set of rollers for supporting said tread plate assembly for movement on said beams,
   said carrier being pivotable about the axis of said first set of rollers to allow the tread plate to move into engagement with the edge of said upper plate,
   and a second set of rollers mounted on said carrier for engaging said beams on pivotal movement of said carrier to transfer the force acting on the edge of said tread plate to the beams when the tread plate rests on the bed of the truck.

9. The dockboard according to claim 8 including a selectively removable rod positioned in said beams to retain said tread plate assembly beneath said upper plate whereby said tread plate assembly can be removed from said ramp member on removal of said removable rod from said beams.

10. The dockboard according to claim 8 including motor means for moving said tread plate assembly between said first position beneath said upper plate to said second position forming an extension of said upper plate.

* * * * *